ROBERT A. BRODING
INVENTOR.

BY Sidney A. Johnson
ATTORNEY

ROBERT A. BRODING
INVENTOR.

BY Sidney A. Johnson
ATTORNEY

Patented Dec. 26, 1950

2,535,666

UNITED STATES PATENT OFFICE 2,535,666

ELECTRICAL LOGGING SYSTEM

Robert A. Broding, Dallas, Tex., assignor, by mesne assignments, to Socony-Vacuum Oil Company, Incorporated, New York, N. Y., a corporation of New York Application January 24, 1949, Serial No. 72,451

18 Claims. (Cl. 175—182)

This invention relates to geophysical exploration and more particularly to the simultaneous determination of two characteristics such as the electrical conductivity and the magnetic susceptibility of formations penetrated by a bore hole.

In logging bore holes, variations in any one of several physical properties of the various strata are susceptible of measurement. There are various systems now known for making such measurements. In Patent 2,220,070 to Aiken there is disclosed a method and system for measuring variations in the electrical resistivity and the magnetic permeability of the formations. The system includes a plurality of exploring coils. A field produced by a first coil is detected by a second and third coil or vice versa. The signal detected and measured at the surface is a function of gradients in the resistivity and the permeability at a given location.

It is an object of the present invention simultaneously to measure two parameters which are functions of different distinct characteristics of formations penetrated by a bore hole.

It is a further object of the invention to make such measurements without interference from sharp local variations along a bore hole.

A further object of the invention is to measure electrical conductivity and magnetic permeability of earth formations.

One embodiment of system for carrying out the present invention includes an exploring unit having an elongated inductance forming one arm of a bridge network and providing an electromagnetic coupling to adjacent earth strata. A detecting circuit coupled to the exploring unit separates and records the bridge unbalance signal in two components. The inductance for coupling the adjacent formations, being long compared to the hole diameter and preferably of low internal reluctance, is designed to produce a bridge unbalance of optimum value thereby to distinguish formations of one character from another.

For more detailed explanation of the invention and for further objects and advantages thereof, reference may now be had to the following description taken in conjunction with the drawings in which.

Figures 1, 2:
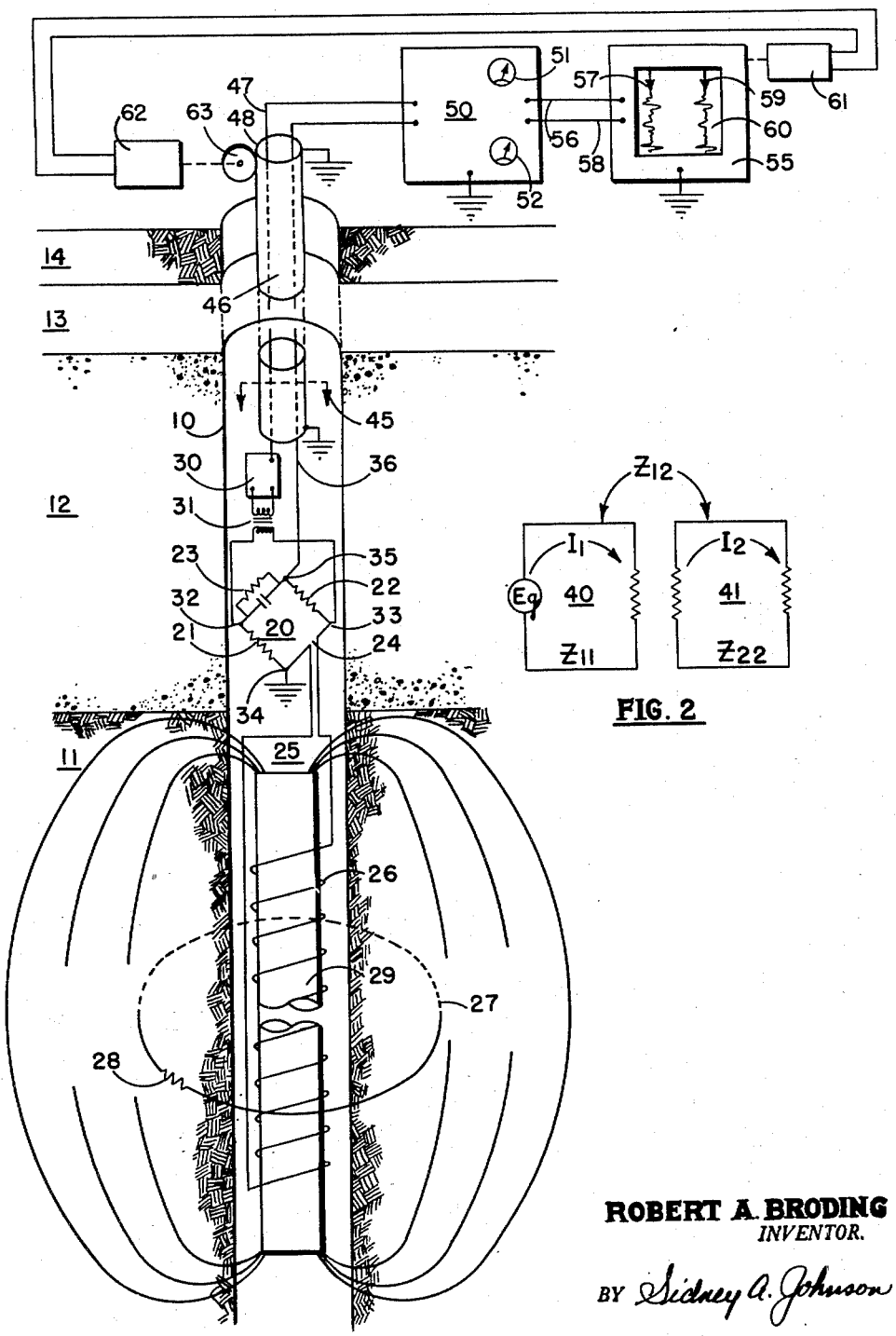
Fig. 1 is a diagrammatic view of the logging system of the present invention and formations to be explored.
Fig. 2 is a schematic representation of a portion of the exploring system of Fig. 1.

In accordance with the present invention a signal is produced which is dependent upon earth conductivity and susceptibility. The signal is detected and divided into two components which are proportional to conductivity and susceptibility, respectively, and which are thereafter measured and/or recorded One embodiment of a system for carrying out the present invention is illustrated in Fig. 1, where a bore hole 10 is illustrated as penetrating to a deep formation 11 through the shallower strata 12, the weathered layer 14 and intermediate layers in the broken section 13.

It is well understood that there may be formations adjacent one another such as the strata 11 and 12 which may not differ in conductivity but may have a substantial difference in susceptibility, or the opposite may be true. In either case, a system which measures but one of the two parameters might miss entirely a boundary of considerable importance with respect to mineral or oil bearing properties or to delineation of subsurface bedding. In accordance with the present invention, an electrical signal is produced which is dependent upon two properties of the formations, the conductivity and susceptibility. Variations in either the formation conductivity or formation susceptibility or both may be thus determined. The signal produced is phase detected to separate the two effects simultaneously to measure and/or record each.

The system illustrated for measuring the above two effects includes a bridge network 20. The bridge circuit, commonly known as a Maxwell bridge, includes resistance arms 21 and 22, a capacitive arm 23 and an inductance arm 24. The inductive arm is an elongated exploring coil 25. The solenoid 25 is to be inductively coupled to formations adjacent the bore hole. The coil should have a length which is great compared with the hole diameter so that substantially all flux follow paths through the formation and not through the hole itself. An elongated coil has an added advantage in that it integrates the effect of a considerable earth section and is not sensitive to sharp local variations such as might be produced by steel chips or the like lodging in the bore hole wall during drilling operations. An integrating solenoid of optimum length is one short enough to yield necessary detail to deliniate formation changes and yet long enough to mask hole contamination. The length may be in the order of 6–10 hole diameters, and as large in diameter as will be permissible for free movement through the hole. In one application, a unit suitable for use in a six inch bore hole was approximately 1 meter in length.

Variation in the electrical impedance of the windings or coil 26 of the solenoid 25 as it travels through the bore hole and adjacent formations of varying physical properties unbalances the bridge 20 to produce at its output diagonals a signal proportional to the variations. As illustrated in Fig. 1, the bridge is excited from an A. C. source of potentials such as an oscillator 30 coupled through transformer 31 to the bridge diagonal 32—33. The signal produced upon unbalance of the bridge is detected at the output diagonal 34—35. The unbalance signal is transmitted from the exploring unit to the surface by way of a conductor 36 connected to terminal 35 while terminal 34 is connected to ground.

The sensitivity and resolving power of the exploring unit may be controlled by selection of the electrical constants of the solenoid 25 not only with reference to the bridge circuit 20 but also with reference to the electrical constants of the formation to which it is electromagnetically coupled. Application of the theory of coupled circuits such as generally discussed in Communication Engineering by Everett, page 220 et seq., to the coupling between the solenoid 25 and the earth formations surrounding it establishes the following relationships: The electrical circuit of the solenoid may be considered that diagrammatically illustrated in Fig. 2. An A. C. source of potential $E_g$ is applied to a circuit 40 having an impedance $Z_{11}$. Coupled thereto is a second circuit 41 having an impedance $Z_{22}$. The mutual coupling or transfer impedance between circuit 40 and 41 is represented by $Z_{12}$.

In the circuit of Fig. 2 considered in terms of the bridge circuit of Fig. 1, the source of potential $E_g$ corresponds with the voltage appearing across terminals 33—34 of the bridge 20. Symbol $Z_{11}$ represents the impedance looking back into the bridge circuit from terminals 33—34 plus the impedance of the windings 26 of the solenoid 25. Symbol $Z_{22}$ may be considered the impedance of the path in which the currents induced in the earth flow. More particularly, the current path may be considered as a single turn 27 (Fig. 1) having a high resistance 28. Since the resistance 28, referred to in the equation below as $R_{28}$, ordinarily is high compared to the reactance of the single turn 27, $Z_{22}$ may be considered equal to resistance 28. The coupling $Z_{12}$ is described by the ratio of the voltage $E_g$ to the current $I_2$ flowing in network 41, Fig. 2, or the current flowing in the loop 27, Fig. 1. In the circuit of Fig. 1, the driving point impedance $Z_{11}'$ (the impedance of the coil 26 viewed from terminals 33—34) is described by the following equation:

$$Z_{11}' = Z_{11} + \frac{Z_{12}^2}{R_{28}} \quad (1)$$

The impedance $Z_{11}$, in Equation 1, is in general complex, being made up of a resistive and a reactive component. Similarly, the transfer impedance or the mutual coupling $Z_{12}$ is a complex number. It has been found that the sensitivity of the exploring unit is determined by the solenoid design. More particularly, $Z_{11}$ is determined by the resistance and the inductance of the coil. The inductance is a function of the number of turns in the coil and the property of the material constituting the flux path. Additionally $Z_{12}$ is a function of the amount of the flux generated by the coil windings of $Z_{11}$ linking the windings of $Z_{12}$. In terms of Fig. 1 the windings of $Z_{11}$ correspond with the coil 26 and the windings $Z_{22}$ with the single turn 27. The resistive component of $Z_{11}$ preferably is made small compared to the reactive component. The reactive component of $Z_{12}$ preferably is small compared with the sum of $R_{28}$ and the resistive component of $Z_{12}$.

From a further examination of Equation 1, it will be seen that a change in either $Z_{11}$, $Z_{12}$, or $R_{28}$, will produce a detectable effect or an unbalance in the bridge network. An unbalance may be produced by either of the two separate and distinct characteristics of the earth formations. An increase in susceptibility of the earth formations increases the inductance of the coil 26 producing corresponding variation in $Z_{11}$. By making the core of the solenoid 25 of low reluctance material, variations in susceptibility of the earth formations are a proportionately larger part of the total susceptibility of the flux path.

To illustrate the foregoing, if a solenoid having a high reluctance core, as for instance a hollow core or a fiber core, is used, the reluctance of the path inside the core will be high compared to the reluctance of the portion of the path formed by the earth formations. Consequently, variations in the reluctance of the formation, as effected by variations in susceptibility will be relatively insignificant when added to the larger portion of the reluctance factor contributed by the path inside the core. Stated another way, variations are so small compared to the total reluctance that they are difficult to measure. However, when the core is made of magnetic material having low reluctance, the sensitivity of the exploring unit with respect to variations in susceptibilty of the formations will be greatly increased since, for all practical purposes, the reluctance of the path inside the core is very low, in most cases legligible, compared to the total reluctance.

For a given M. M. F., the flux penetrating the formations and linking the loop 27 is increased by a lowering of the reluctance of the flux path. The term $Z_{12}$ of the second factor $$\frac{Z_{12}}{R_{28}}$$

of Equation 1 also is increased, thus increasing the sensitivity of the exploring unit with respect to conductivity variations in the formations.

The unbalance signal produced by a variation in susceptibility and that produced by a variation in conductivity of the formations, when viewed from the terminals 33—34 of the exploring coil, are spaced 90° in time phase from one another. This makes possible a separation and simultaneous measurement of the two effects.

Referring again to Fig. 1, the elements located below the arrow 45 are preferably encased in a housing or torpedo which may conveniently be lowered into a hole. Leading from the exploring unit to the surface is a cable 46 which includes the conductor 36 from the bridge 20, a second conductor 47 from the oscillator 30, and a shield or conductive sheath 48 which is grounded both at the surface and to the case or housing for the exploring unit. The cable 46 will also include a tension member (not shown) to bear the weight of the exploring unit and the forces exerted in lowering the exploring unit into a bore hole and lifting it therefrom.

The unbalance signal from the bridge 20 is fed to a detector 50 located at the surface. The detector includes phase sensitive means for separating the unbalance signal into a first component proportional to the apparent conductivity of the formation and a second component proportional to the susceptibility of the formation. The two signals are separated with reference to a signal from the oscillator 30 which is connected to the detecting circuit 50 by way of the conductor 47. The detecting unit 50 includes meters 51 and 52 which, when suitably calibrated, indicate conductivity and susceptibility respectively. The output of the detecting circuit may also include a dual recording unit 55.

The conductivity or resistive component indicated by meter 51 may be coupled to the recorder 55 by way of conductor 56 and is recorded by the pen 57. Similarly, the susceptibility component indicated by meter 52 is coupled to the recorder by conductor 58 and is impressed upon the chart 60 of the recorder 55 by the pen 59. The length of the chart may conveniently be marked in units of depth so that the record produced will be a direct indication of the variation of the above factors with the depth of the bore hole. This may conveniently be accomplished by driving the chart feed of the recorder 55 proportional to the travel of the exploring unit by a Selsyn 61 which is excited by a companion Selsyn 62. The Selsyn 62 may be driven by pulley 63 which is mechanically coupled to or driven by the cable 46.

Figure 3:
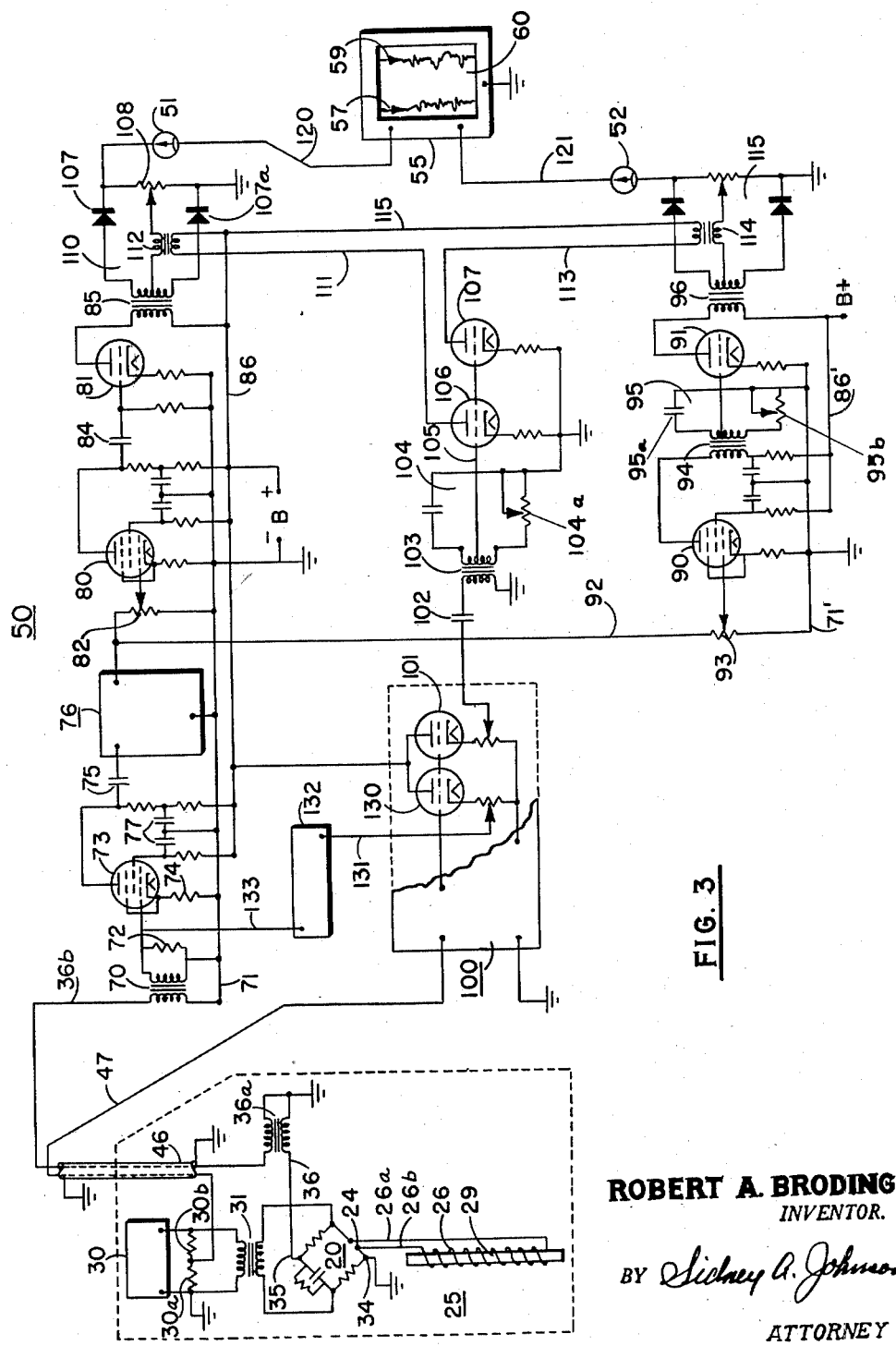
Fig. 3 is a schematic diagram of the logging system.

The logging system above-described is illustrated in greater detail in the schematic diagram of Fig. 3. Where possible, parts corresponding to those of Fig. 1 have been given the same reference characters. Referring now to Fig. 3, the leads 26a and 26b from the windings 26 of the solenoid 25 are connected in the arm 24 of the bridge 20. The signal across the output diagonal 34—35 is conducted over line 36 to the primary winding of transformer 36a and thence to ground. The secondary of the transformer 36a has one terminal connected to ground and the second terminal to the input transformer 70 of detecting circuit 50 by way of conductor 36b. The portion of Fig. 3 enclosed by the dotted outline comprises the exploring unit lowered into the bore hole.

The surface portion of the logging system includes the detecting circuit 50. The primary of transformer 70 has its second terminal connected to the ground or chassis 71. The secondary circuit of transformer 70 includes a resistance 72 and the control grid of the pentode amplifier tube 73. The cathode circuit of tube 73 includes a bias resistor 74. The unbalance signal from the bridge 20 is amplified in tube 73, the output from the plate circuit thereof being fed through condenser 75 to a filtering network 76. The plate and screen of tube 73 are illustrated as de-coupled in conventional manner as by the condensers 77 and are supplied from a common source of plate potential B+.

The filtering network 76 is preferably of the band pass type peaked at the frequency of the oscillator 30 to eliminate unwanted or extraneous signals from the system. The output from the filtering circuit 76 is then fed to a first amplifying channel which includes tubes 80 and 81. More particularly, the output of circuit 76 appearing across resistor 82 is fed to the control grid of the tube 81. The circuit of amplifier tube 81 may correspond to that of tube 73. The output from the plate circuit of tube 80 is fed by way of condenser 84 to the triode 81. The anode circuit of the tube 81 includes an output transformer 85. The anodes of tubes 80 and 81 are supplied from common B+ bus 86.

The output from the filter circuit 76 is also fed to a second channel including tubes 90 and 91. More particularly, the conductor 92 applies the output signal from the circuit 76 to the potentiometer 93. The control grid of the tube 90 is connected to the variable tap of the potentiometer 93. The circuit of tube 90 is generally the same as that of tube 73 except that the anode circuit has a transformer output. The primary winding of the output transformer 94 is connected in series with the anode of tube 90. The secondary of transformer 94 is connected to a phase shifting network 95.

The phase shifting network includes a condenser 95a and a resistance 95b series connected and in circuit with the secondary of the output transformer 94. The common juncture of condenser 95a and resistance 95b is grounded to bus 71'. The grid of tube 91 is connected to the center-tap in the secondary of transformer 94. The reactance of condenser 95a and resistance 95b are made equal at the frequency of oscillator 30 so that the signal voltage appearing on the grid of tube 91 will be shifted 90° in phase from the voltage appearing across the secondary of transformer 94. Accordingly, the voltage applied to the control grid of the tube 91 is displaced in phase 90° from the voltage applied to the control grid of the tube 81. The output or anode circuit of tube 91 includes the transformer 96. The anodes of tubes 90 and 91 and the screen of tube 90 are fed from the common B+ supply 86'.

With the system above described, the unbalance signal detected from the bridge diagonal 34—35 is applied to the primaries of the transformers 85 and 96. The voltages at transformers 85 and 96 may have the same magnitude but will differ in phase by 90°. Since variations in conductivity and susceptibility ordinarily will not be of the same magnitude and in view of the desirability of recording the two components with approximately the same definition, potentiometers 82 and 93 are calibrated to provide a means of determining accurately the values of conductivity and susceptibility changes.

As above explained, the effect of variations in the conductivity of the formations (or in the representative resistance 28, Fig. 1), and in the susceptibility of the earth formation as reflected in the impedance of the solenoid 25 will be 90° out of phase. Accordingly, the signals applied to the transformers 85 and 96 may be compared with a reference voltage simultaneously to determine the magnitude of the resistivity and susceptibility effect. The reference voltage is obtained from the output of the oscillator 30 which is applied to the resistors 30a and 30b connected in parallel with the primary of transformer 31. The left-hand terminal of the oscillator 30 as illustrated in Fig. 3 is grounded. The common juncture of resistors 30a and 30b is connected to the conductor 47 through the cable 46 leading to the surface. At the surface, the conductor 47 is connected to an amplifying channel 100 included in the detecting circuit 50. The output section of the amplifier 100, in the form illustrated, includes a cathode follower triode 101. The output of the cathode follower is fed through the condenser 102 to the primary of transformer 103. The secondary of the transformer 103 is connected to a phase shifting network 104. The output of the phase shifting network is connected by way of conductor 105 to the control grids of triodes 106 and 107. The output of the triode 106 is utilized in a phase sensitive network 110, which includes the secondary of transformer 85, to measure the conductivity component of the bridge unbalance signal. More particularly, the plate circuit of the tube 106 includes conductor 111 connected to the primary of the transformer 112. The other terminal of the primary of transformer 112 is connected to the common B+ bus 86. Similarly, the plate circuit of tube 107 includes conductor 113, the primary of transformer 114 and thence by way of conductor 115 to the common B+ bus. The transformer 114 is included in a second phasing circuit 115 which also includes the transformer 96. The output of the circuit 115 is proportional to susceptibility.

The phase sensitive circuits 110 and 115 are well known in the art. Their operation is described in Servomechanism Fundamentals by Lauer, Lesnick, Matson (McGraw-Hill) pp. 206–209. Briefly, circuit 110 includes rectifiers 107 and 107a, and output resistor 108. The rectifiers 107 and 107a are similarly poled with respect to the reference voltage applied through transformer 112 and are oppositely poled with respect to the signal voltage across transformer 85. Their operation is such that the meter 51 in the output circuit of the phasing network 110 indicates a value proportional to the magnitude of the signal applied to the primary of transformer 85 which is "in phase" with the reference voltage from oscillator 30 applied to the primary of the transformer 112. This output signal is fed to meter 51 and thence, by way of conductor 120, to one channel of the recorder 55 and is impressed on the chart 60 by the pen 57.

The circuit 115 is the same both in construction and operation as circuit 110. The meter 52 in the output circuit of the phasing network 115 indicates a voltage proportional to the component of the voltage applied to the primary of the transformer 96 which is "in phase" with the reference voltage applied to the primary of transformer 114. This voltage is fed by way of conductor 121 from meter 52 to the second input of the recorder 55 and is recorded on the chart by the pen 59.

Since the signal appearing at transformer 85 differs from that appearing at transformer 96 by a phase angle of 90°, the signals applied to the recorder are functions of components of the unbalance signal from the bridge 20 which are 90° apart. Upon suitable calibration and adjustment described below, the meter 51 may be made to indicate resistive effects as seen by the solenoid 25 and the meter 52, susceptibility effects.

In addition to coupling the oscillator or reference signal from the amplifier 100 to the phase sensitive networks 110 and 115, the signal is also fed from a second cathode follower 130 in amplifier 100 by way of conductor 131 to a phasing network 132 similar to network 104. The output of the network 132 is coupled by way of conductor 133 to the control grid of the tube 73. Suitable adjustment of the amplitude and phase of the reintroduced voltage on conductor 133 compensates for residual unbalance of the bridge circuit.

In operation the phase angle between the signal voltages applied to the grids of tubes 81 and 91 (Fig. 3) is always 90° due to the phase shift in circuit 95. Prior to lowering the exploring unit in a bore hole, the exploring unit including the solenoid 25 is suspended in air. The signal from the phasing network 132 is then adjusted to compensate for residual unbalance in the bridge network 20. Such initial adjustment may be made by measuring with a suitable instrument, for instance, a vacuum tube volt meter, the signal across the grid resistor 82. The system is calibrated after the residual unbalance is suitably nulled, by coupling a test coil of a few turns of wire to the coil 25 as for instance by encircling the housing of coil 25 therewith. If the test coil is terminated in a resistance high compared to its inductance, the unbalance introduced through the bridge circuit 20 by its presence will be purely resistive. Adjustment of potentiometer 104a in the phase shift circuit 104 is then made so that the unbalance signal caused by presence of the resistance terminated coil will be "in phase" with the signal applied to the transformer 85 of the phase-sensitive circuit 110. When the phase shift in the circuit 104 has been properly adjusted, the resistance inductively coupled to the coil 25 may be brought into or removed from the proximity of the coil 25 without producing any effect on the output of the phase sensitive circuit 115 indicated by meter 52. At the same time a maximum effect will be observed on the output of the phase-sensitive circuit 110 indicated by the meter 51. When such initial adjustments have been made, the exploring unit may be lowered into the hole to record the variations in the conductivity and the susceptibility of the formations encountered.

While a particular embodiment of the invention has been shown, it will be understood that modifications will now suggest themselves to those skilled in the art. It is therefore intended to cover such modifications of the invention as fall within the scope of the appended claims.

What is claimed is:

1. A system for measuring changes in the electrical character of formations penetrated by a bore hole which comprises an exploring unit movable along the bore hole and including as a component part thereof an alternating current bridge network having an elongated inductance forming one arm of said network and disposed lengthwise of said bore hole for producing an electromagnetic field in the strata adjacent thereto, said bridge having circuit-connections for application thereto of alternating current input signals and output connections, means for establishing balanced conditions in said bridge network with said exploring unit in a predetermined position, means for moving said exploring unit in said bore hole past said formations to unbalance said bridge in accordance with variations in the electrical properties of said formations for production of signals, and measuring means including a detecting circuit having branches respectively connected to said circuit-connections and to said output connections in which the signals applied thereto are opposed, said measuring means including an element movable in accordance with the algebraic difference between said signals to indicate an electrical characteristic of said formations.

2. The combination set forth in claim 1 in which said detecting circuit includes signal-dividing means for producing one component varying with one electrical characteristic of said formations and a second component varying with a different electrical characteristic of said formations, thereby simultaneously to secure information as to different electrical characteristics of the same formations.

3. The combination set forth in claim 1 in which said detecting circuit includes a signal-dividing means for production of a component which varies in accordance with the permeability of said formations and a second component which varies in accordance with the conductivity of said formations.

4. A system for measuring the conductivity and susceptibility of earth formations penetrated by a bore hole which comprises an exploring unit including a bridge network, an inductance in one arm of said bridge network disposed in inductively coupled relation to strata adjacent thereto, means for lowering and raising said exploring unit in said bore hole for travel of said inductance past said formations to produce an unbalance voltage in said bridge network, detecting means including phase-shifting circuit-components for separating said unbalance voltage into a resistive and a reactive component and means for measuring said components as a function of the location of said exploring unit in said bore hole.

5. A system for recording conductivity and susceptibility of earth formations penetrated by a bore hole which comprises an exploring solenoid, a bridge network, said solenoid forming one arm of said bridge network, said network having output terminals and input terminals for application to said network of low frequency alternating current signals for exciting said bridge, means for moving said solenoid through said bore hole and adjacent said formations to produce an unbalance signal between said output terminals of said bridge network proportional to the conductivity and susceptibility of said formations, a detecting circuit connected to said output terminals and responsive to said unbalance signal, a circuit coupling said detecting circuit to said source of low frequency signals, and phasing means in said detecting circuit utilizing said low frequency signals as a reference to separate said unbalance signal into an in-phase component and an out-of-phase component, and means for recording said components as a function of the location of said solenoid in said bore hole.

6. A well-logging system which comprises a bridge network, a solenoid forming one arm of said network, an alternating current source of exciting potential connected to a first diagonal of said network, means for supporting and moving said solenoid in a bore hole in inductively coupled relation to adjacent earth formations to produce an unbalance signal at the second diagonal of said bridge network having one component proportional to the conductivity and another component proportional to the susceptibility of said formations, detecting means connected to said second diagonal of sa'd network and including two circuits, means for applying said unbalance voltage to said output circuits in phase displacement to separate said components, a circuit coupling said source of exciting potential to both of said circuits in the same phase to produce in the first of said circuits a signal proportional to the component out of phase with said exciting potential and to produce in the second of sa'd circuits a signal proportional to the in-phase component with respect to said exciting potential and means for measuring said components.

7. A well-logging system which comprises a bridge network, a solenoid forming one arm of said network, an alternating current source of exciting voltage connected to a first diagonal of said network, means for moving said solenoid in a bore hole in inductively coupled relation w'th adjacent earth formations to produce an unbalance signal at the second diagonal of said bridge network having components respectively proportional to the conductivity and susceptibility of said formations, detecting means connected to said second diagonal of said network and including two circuits, means for applying sa'd unbalance signal to said circuits in phase displacement, circuit means connecting said source of excit'ng voltage to both said output circuits in the same phase to produce in the first of said circuits a signal proportional to the component of sa'd unbalance signal out of phase with said exciting voltage and to produce in the output of the second of said circuits a signal proportional to its in-phase component with respect to sa'd exciting voltage and means for recording said signals from said output circuits as a function of depth of said solenoid.

8. A system for logging earth formations penetrated by a bore hole which comprises a bridge network, means for exciting said bridge network at a selected frequency, an inductive exploring element included in said bridge and electromagnetically coupled to said formations to produce an unbalance signal in said network proportional to a resist've and an inductive property of formations adjacent said element, detecting means connected to the output diagonals of said network, said detecting means including amplifying means and two phase sensitive networks, a phase shifting network intermediate said amplifying means and one of said phase sensitive networks to apply said unbalance signal thereto in quadrature with respect to the signal applied to the other phase sensitive network, a circuit including amplifying means for applying a reference signal in phase to both of said bridge networks, said amplifying means includ'ng a second phase shifting network for adjustment of the phase angle between said reference signal and said unbalance signal, and means for separately recording the components of said unbalance signal from each of said phase sensitive networks.

9. A system for logging earth formations penetrated by a bore hole which comprises a Maxwell br'dge, a source of audio frequency signals for exciting said bridge, an exploring element included in said bridge and electromagnetically coupled to said formations to produce an unbalance signal in said br'dge proportional to a resistive and an inductive property of formations adjacent said element, a detecting circuit connected to the output diagonals of said bridge, said detecting c'rcuit including a signal amplifier and two phase sensitive networks, a phase shifting network connected between said amplifier and one of said phase sensitive networks to apply said unbalance signal thereto in quadrature with respect to the unbalance signal applied to the other phase sensitive network, a circuit including amplifying means having input terminals connected to said output diagonals and connected to apply a reference signal in phase to both of said phase sensitive networks, said ampl'fying means including a second phase shifting network adjustment of the phase between said reference signal and said unbalance signal, and means for measuring the two components of said unbalance signal from said phase sensitive networks.

10. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of a selected time-phase component of said output signals with respect to said reference signal, and said measuring means including an element for indicating the magnitude of said selected time-phase component relative to said reference signal.

11. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil having a length at least six times the diameter of the bore hole electrically connected in one arm of said network and mechanically supported by said unit substantially coaxially of said bore hole in electromagnetic coupling relation with said formations for unbalancing said bridge to produce output signals at said output terminals varying with change in the electrical characteristics of said formations, measuring means including a phase-comparing circuit having two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of a selected time-phase component of said output signals with respect to said reference signal, and said measuring means including an element for indicating the magnitude of said selected time-phase component relative to said reference signal.

12. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of an in-phase component of said output signals with respect to said reference signal, and said measuring means including an element for indicating the magnitude of said in-phase component relative to said reference signal.

13. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of an out-of-phase component of said output signals with respect to said reference signal, and said measuring means including an element for indicating the magnitude of said out-of-phase component relative to said reference signal.

14. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, each of said connecting means having phase-shifting circuit-components which respectively modify the reference signal for comparison respectively of the in-phase and out-ofphase components of said output signals, and said measuring means including elements for respectively indicating the magnitude of said in-phase and said out-of-phase components.

15. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application thereto of alternating current, an inductance electrically connected in one arm of said network and mechanically supported by said unit in position for electromagnetic coupling with said formations for unbalancing said bridge to produce output signals at said output terminals dependent upon electrical characteristics of said formations, measuring means including two phase-sensitive networks, circuit connections for applying to each of said networks said output signals from said bridge and for applying thereto the alternating current applied to said input terminals of said bridge, said measuring means including circuit components for a comparison in one of said phase-sensitive networks of the in-phase component of said output signal with respect to said alternating current and establishing in said other phase-sensitive network a comparison of the quadrature component of said output signal with reference to said alternating current, and means connected to each of said phase-sensitive networks for indicating the magnitude respectively of said in-phase component and said quadrature component of said output signal.

16. A system for measuring changes in the character of formations penetrated by a bore hole comprising an exploring unit adapted to be lowered and raised in said bore hole for movement past said formations, said unit including a balanceable alternating current bridge network, said bridge having output terminals and input terminals for application to said bridge of alternating current, an inductance coil having a low-reluctance internal flux path electrically connected in one arm of said network and mechanically supported by said unit in position for electromagnetic coupling with said formations for unbalancing said bridge to produce output signals at said output terminals varying with change in the electrical characteristics of said formations, measuring means including a phase-comparing network having an output circuit and two input circuits, connecting means between said input terminals and one of said input circuits for applying to said one of said input circuits a reference signal from said alternating current source, connecting means extending between said output terminals and said other of said input circuits for applying to said other of said input circuits said output signals from said bridge, one of said connecting means having phase-shifting circuit-components for selective comparison of a selected time-phase component of said output signals with respect to said reference signal, and said measuring means including an element for indicating the magnitude of said selected time-phase component relative to said reference signal.

17. In electrical logging where a bridge network having a coil is used to log a bore hole, the method which comprises exciting said bridge and said coil electromagnetically to couple the formations adjacent said bore hole to said network, moving said coil through said bore hole to unbalance said bridge proportionally with respect to variations in the susceptibility and conductivity of said formations, separating the unbalance signal from said bridge into a component in phase and a component out of phase with respect to the excitation of said bridge network, and separately measuring said components for determination of variations in resistivity and susceptibility of said formations.

18. In electrical logging where a bridge network having a coil is used to log a bore hole, the method which comprises exciting said bridge and said coil electromagnetically to couple the formations adjacent said bore hole to said network, moving said coil through said bore hole to unbalance said bridge proportionally with respect to variations in the electrical properties of said formations, separating from the unbalance of said bridge a selected time-phase component of said unbalance with respect to the excitation of said bridge network, and measuring said time-phase component for determination of variations in the electrical properties of said formations giving rise to said selected time-phase component of said unbalance.

ROBERT A. BRODING.

REFERENCES CITED

The following references are of record in the file of this patent:

UNITED STATES PATENTS

| Number | Name | Date |
|---|---|---|
| 2,170,857 | Elliot | Aug. 29, 1939 |
| 2,199,367 | Athy | Apr. 30, 1940 |
| 2,225,668 | Subkow | Dec. 24, 1940 |
| 2,250,703 | Crites | July 29, 1941 |
| 2,390,409 | Aiken | Dec. 4, 1945 |
| 2,428,155 | Guyod | Sept. 30, 1947 |
| 2,436,563 | Frosh | Feb. 24, 1948 |
| 2,435,985 | Stewart | Feb. 17, 1948 |
| 2,470,828 | Millington | May 24, 1949 |